United States Patent Office 3,086,838
Patented Apr. 23, 1963

3,086,838
METHOD OF PURIFYING GASEOUS MIXTURES FROM ACIDIC COMPOUNDS
Giuseppe Giammarco, Porto Marghera, Italy, assignor to Vetrocoke S.p.A., Turin, Italy
No Drawing. Filed Oct. 28, 1958, Ser. No. 770,016
Claims priority, application Italy Nov. 2, 1957
3 Claims. (Cl. 23—2)

This invention relates to an improvement in methods of removing $H_2S$ alone or jointly with carbon dioxide and other acidic gases from gaseous mixtures by scrubbing the latter by means of arsenical solutions as disclosed by U.S. patent application Ser. No. 594,775, filed June 29, 1956, now Patent No. 2,943,910, dated July 5, 1960.

The invention moreover concerns an improvement in methods employing alkaline solutions for purifying gaseous mixtures containing $H_2S$, $CO_2$ and HCN alone or jointly. When absorbing $H_2S$ the invention concerns both cyclic and oxidizing processes.

In industrial practice the abovementioned methods are objectionable in that, when HCN is contained in the gaseous mixture, it gives rise to the formation of sulphocyanide which, while being an inert compound in respect of acidic gas absorption, consumes on forming alkali and sulphur which are ultimately lost.

A further drawback resides in the formation of thiosulphate by the action of any oxygen contained in the gaseous mixture, more particularly in oxidizing processes by action of the air employed for reactivating the solution on sulphurated compounds contained in the solution. Formation of thiosulphate, which is inert in respect of acidic gas absorption, likewise leads to alkali and sulphur losses. It is moreover known that such drawback is more particularly serious with oxidizing processes. For instance, it may be recalled that in the method known as Seaboard method 25 to 40% of absorbed sulphur is oxidized, oxidation reaching up to 25% with other known methods, such as the "Thylox" and Otto-Staatsmijnen.

As a result of the abovementioned objectionable occurrences the absorbing solutions are gradually loaded by the abovementioned inert compounds, namely sulphocyanide and thiosulphate, removal of which in industrial practice necessitates part rechange of the solution and discharge of the contaminated solution to the outside, which as is well known, is forbidden by health rules, more particularly in the case of arsenical solutions.

A further drawback has been ascertained in industrially carrying out purifying methods employing alkaline solutions. It was namely ascertained that, in addition to sulphocyanide and thiosulphate, in the absorbing solutions, more particularly when employed in the hot, further sulphurated compounds are present, the sulphur therein binding and rendering ineffective alkali by a larger quantity than with thiosulphate. Such compounds, which probably represent an intermediate sulphur oxidizing stage before thiosulphate is formed, shall be referred to hereafter as "intermediate oxidation sulphurated compounds." This difficulty leads in industrial practice to weakening of the absorbing solutions, not only when removing $H_2S$, but also when removing $CO_2$ from gaseous mixtures containing said $CO_2$ together with small quantities of $H_2S$. Moreover, such intermediate oxidation sulphurated compounds are apt to act as negative catalysts in respect of absorption.

The object of this improvement is to decompose sulphocyanide, thiosulphate and intermediate oxidation sulphurated compounds as defined above, formed in the solutions employed for absorbing $H_2S$ alone or jointly with $CO_2$ and further acidic gases.

A further object is to recover sulphur and alkali contained in said substances.

A further object is to avoid discharging from the plant the absorbing solutions having become loaded by the above mentioned substances.

This improvement consists in that from the operating cycle of a process for removing $H_2S$, $CO_2$ and HCN from gaseous mixtures by scrubbing by means of absorbing solution part of the solution is drawn off and heated to a temperature exceeding 200° C. to decompose sulphocyanide, thiosulphate and intermediate oxidation sulphurated compounds, whereby sulphur and alkali contained therein can be recovered at least in part. The solution can be heated and evaporated to dryness, whereafter the resulting solid residue is heated to a temperature ranging between 200 and 400° C., preferably 250 and 300° C. Otherwise the solution may be heated in an autoclave at superatmospheric pressure at a temperature ranging between 200 and 300° C., preferably 250 and 280° C. After the sulphocyanides, thiosulphate and intermediate sulphur oxidation products have been decomposed, the solution issuing from the autoclave or the solution obtained by dissolving the solid saline residue, respectively, is returned to the operative cycle for purification of the gaseous mixtures.

The improvement is more particularly advantageous in use in connection with methods of purifying gaseous mixtures from $H_2S$ alone or jointly with $CO_2$ by means of the arsenical solutions according to the abovementioned co-pending application, in which the active compounds are non-sulphurated oxygenated arsenic compounds.

In this case it has been found that the presence of oxygenated arsenic compounds considerably improves decomposition of sulphocyanide. Decomposition occurs through a number of reactions, the sulphocyanide yielding at first sulphur to the oxygenated arsenic compounds and being converted to cyanate according to a reaction of the type:

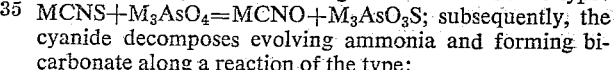

subsequently, the cyanide decomposes evolving ammonia and forming bicarbonate along a reaction of the type:

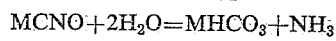

The alkali in the sulphocyanide is thus fully recovered in an active form, whereas the sulphur forms a regenerable sulphur salt of arsenic from which it can likewise be recovered. The above formulated decomposition occurs either on heating the solution to dryness, or on heating the solution in autoclave. It should be noted that heating to dryness of the sulphocyanide alone in the absence of arsenical compounds does not lead to any decomposition.

When used in connection with a low alkaline solution drawn off from a gas purification plant and of the type employed for absorbing $H_2S$ alone at atmospheric pressure according to the abovementioned application the improved method yields the following results. The solution having become charged with time with sulphocyanide, being of the following composition: active $Na_2O$ titratable by methylorange 12.0 g./l., arsenious oxide 21.4 g./l., pentavalent arsenic expressed as $As_2O_3$ 37.6 g./l., sulphur bound as monothioarsenate 2.1 g./l., sodium sulphocyanide expressed as S 20.0 g./l., is brought to dryness, the saline residue being heated to 250° C. during ½ hour. After redissolving it in a water quantity corresponding to the initial volume, the composition is found to have been modified as follows: active $Na_2O$ titratable by methylorange 16.0 g./l., arsenious oxide 27.9 g./l., pentavalent arsenic expressed as $As_2O_3$ 31.1 g./l., sulphur bound as thiosalt of arsenic 16.2 g./l., sodium sulphocyanide expressed as S 5.9 g./l. The solution so obtained is returned to the absorption cycle.

A solution according to the abovementioned application as employed for chiefly absorbing $CO_2$, hence of high alkalinity, is similarly heated to dryness, the composition of the solution being as follows: active $Na_2O$ titratable by methylorange 106.4 g./l., arsenious oxide 57 g./l., pentavalent arsenic expressed as $As_2O_3$ 33.9 g./l., sulphur bound as monothioarsenate 3.5 g./l., sodium sulphocyanide expressed as sulphur 20.1 g./l. The dry residue obtained upon heating is then redissolved in a water quantity corresponding to the initial volume, giving rise to the following composition: active $Na_2O$ titratable by methylorange 108.3 g./l., arsenious oxide 59.5 g./l., pentavalent arsenic expressed as $As_2O_3$ 31.4 g./l., sulphur bound as thiosalt of arsenic 19.3 g./l., sulphocyanide expressed as S 4.2 g./l.

It will be seen in both cases that most of the sulphocyanide is decomposed and, like the corresponding sulphur, is recovered as arsenic thiosalt. Alkali corresponding to the decomposed sulphocyanide is but slightly visible on analyses but, on boiling the solution, it becomes likewise apparent by subsequent hydrolysis of the cyanate.

Heating of the solution as such at high temperature and superatmospheric pressure in an autoclave improves decomposition of the sulphocyanide, possibly because the cyanate is readily and fully hydrolysed. For instance, a solution according to the above-mentioned application as drawn off from an $H_2S$ and $CO_2$ absorption circuit, being of the following composition: active $Na_2O$ titratable by methylorange 93.4 g./l., arsenious oxide 70.5 g./l., pentavalent arsenic expressed as $As_2O_3$ 28.1 g./l., sulphur bound as monothioarsenate 2.8 g./l., sodium sulphocyanide expressed as sulphur 21.8 g./l. is heated to 260° C. at a pressure of 50 atm. Upon heating the solution results modified as follows: active $Na_2O$ titratable by methylorange 113.8 g./l., arsenious oxide 72.5 g./l., pentavalent arsenic expressed as $As_2O_3$ 23.4 g./l., sulphur bound as thiosalt 23.8 g./l., sodium sulphocyanide expressed as S 0.8 g./l. It is found in this case that sulphocyanide is actually fully decomposed, both sulphur and alkali being recovered. The solution obtained by heating is returned to the absorption circuit.

As concerns thiosulphate, the latter likewise decomposes in the presence of the arsenical compounds, mainly in the presence of arsenite along a reaction of the type:

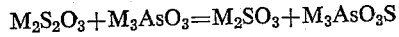

$$M_2S_2O_3 + M_3AsO_3 = M_2SO_3 + M_3AsO_3S$$

through which half of the sulphur in the decomposed thiosulphate is recovered as thiosalt, the thiosulphate being converted to sulphite, then to sulphate which, more particularly with regard to potassium sulphate, is readily removable from the solution by crystallisation.

For instance, a solution of the type employed for absorbing $H_2S$ at atmospheric pressure, of the following composition: active $Na_2O$ titratable by methylorange 8.3 g./l., $As_2O_3$ 26.7 g./l., pentavalent arsenic expressed as $As_2O_3$ 24.6 g./l., sulphur bound as monothioarsenate 0.9 g./l., sodium sulphocyanide expressed as S 20.8 g./l., sodium thiosulphate expressed as S 16.7 g./l. is drawn off from the absorption circuit and heated to dryness, the solid residue being heated to 300° C. during ½ hour. Upon redissolving it in a water quantity corresponding to the initial volume, the resulting solution which is returned to the absorption circuit is of the following analyses: active $Na_2O$ titratable by methylorange 30.0 g./l., arsenious oxide 38.3 g./l., pentavalent arsenic expressed as $As_2O_3$ 13.0 g./l., sulphur bound as thiosalt 25.8 g/l., sodium sulphocyanide expressed as S 0.6 g./l., sodium thiosulphate expressed as S 8.5 g./l.

Still further improved results are obtained by heating the solution as such at high temperature in an autoclave.

For instance, a solution of the type employed for absorbing $CO_2$ and $H_2S$ containing arsenite, arsenate and monothioarsenate, of high alkalinity equivalent to 67.8 g./l. active $Na_2O$ titratable by methylorange, more over containing sodium sulphocyanide expressed as S 22.3 g./l. and sodium thiosulphate expressed as S 7.5 g./l., is drawn off from the absorption circuit and heated in an autoclave to 260° C. and 48 atm. Upon heating, total absence of thiosulphate and sulphocyanide is ascertained, alkalinity having risen to 89.4 g./l. active $Na_2O$, the sulphur bound as arsenic thiosalt having increased from 0.7 g./l to 26.7 g./l. The solution so obtained is returned to the absorption circuit.

It will be seen from the two above examples that all the sulphur deriving from the sulphocyanide plus one half the sulphur from the thiosulphate are found as thiosalt from which the sulphur may be recovered. At the same time an increase in active alkali corresponding to the decomposed sulphocyanide is ascertained.

When using non-arsenical alkaline absorbing solutions the improved method likewise affords decomposition of sulphocyanide and recovery of its useful components, the thiosulphate however being not decomposed as distinct from the use of arsenical solutions. Decomposition of sulphocyanide does not occur as readily as when arsenical compounds are present, but a slight increase in temperature as compared with arsenical solutions will yield a satisfactory industrial result.

For instance a sodium carbonate solution of the type employed for absorbing $H_2S$ containing active $Na_2O$ titratable by methylorange 70.6 g./l., sulphur as sulphide 0.2 g./l., sodium sulphocyanide expressed as sulphur 35.6 g./l., is drawn off from the absorption circuit and heated in an autoclave to 260° C. and 48 atm. during 4 hours. After heating the solution results to contain ammonia and $H_2S$ from the decomposition of sulphocyanide and is of the following composition: active $Na_2O$ titratable by methylorange 92.9 g./l., sulphur as sulphide 23.5 g./l., sodium sulphocyanide expressed as S 12.6 g./l. The solution so obtained is returned to the absorption circuit. It is pointed out that decomposition of sulphocyanide has occurred by about 65%, both the alkali and sulphur in the decomposed portion being recovered.

As mentioned above sulphocyanide heated to high temperature alone does not lead to decomposition, while heatto high temperature of the sulphocyanide containing solutions leads in accordance with the above described example to an industrially convenient decomposition, which is probably due to the fact that the cyanate resulting from a first initial decomposition of the sulphocyanide on hydrolysing in a liquid phase at high temperature improves subsequent decomposition of the sulphocyanide.

Decomposition by heating of the solution up to dryness, which resulted suitable for use in the presence of oxygenated arsenic compounds, could in this case also be carried out by heating the sulphocyanide in a dry state in the presence of metal oxides capable of yielding their oxygen content.

As concerns thiosulphate, decomposition of the latter in non-arsenical solution does not occur by an appreciable extent, as was ascertained through special experiments carried out on synthetic solutions prepared by admixture of thiosulphate as such.

Industrial practice of this improvement in plants for purifying gaseous mixtures by means of alkaline solutions has unexpectedly shown that an oxidation compound of sulphur exists in the absorbing solutions other than thiosulphate. The sulphur therein resulted capable of being regenerated and recovered by heating at high temperature, which does not occur with thiosulphate; moreover, it binds and renders ineffective a larger alkali quantity than that corresponding to thiosulphate. This result which was unknown heretofore, was ascertained both in plants utilizing arsenical alkaline solutions in accordance with the abovementioned application, and in plants employing non-arsenical solutions.

For instance, in an industrial plant for purifying coke oven gas from its $CO_2$ content together with slight residual $H_2S$ quantities by absorption at superatmospheric pressure at a temperature of 75° C. and regeneration in an air stream, it was found that the solution comprising sodium carbonate had gradually become enriched with time with sulphocyanides and oxidation compounds of sulfur, the solution then being of the following composition: active $Na_2O$ titratable by methylorange 59.8 g./l., sulphur as sulphide 0.2 g./l., sulphur as sodium sulphocyanide 21.3 g./l., sulphur as sulphur oxidation compounds 13.0 g./l. As a result of an extensive use of the improved method, in which a proportion of the solution was continuously drawn off from the absorption circuit and heated in an autoclave up to 270–280° C., the proportion was found to be modified as an average to the following composition: active $Na_2O$ titratable by methylorange 100.5 g./l., sulphur as sulphide 17.6 g./l., sulphur as sodium sulphocyanide 11.9 g./l., sulphur as sulphur oxidation compounds 5.0 g./l. The regenerated proportion of solution was continuously returned to the absorption circuit.

It is found that upon hot treatment of the solution the sulphur contained therein as sulphide increases by a greater extent than corresponds to decomposition of sulphocyanide alone, that is sulphur in the sulphur oxydation compounds too has become converted to recoverable sulphide. It is further found that upon hot treatment the alkalinity of the solution expressed as active $Na_2O$ titratable by methylorange, upon subtracting $NH_3$ from decomposition of sulphocyanide, has increased by an extent considerably exceeding the quantity corresponding to the decomposition of sulphocyanide, even exceeding the quantity corresponding to decomposition of the sulphur oxidation compounds should they consist of thiosulphate.

In another industrial plant employing arsenical solutions for purification from $CO_2$ and $H_2S$ at superatmospheric pressure according to the abovementioned application, the same occurrence was ascertained. In said plant the solution had become charged with time with sulphocyanides and sulphur oxidation compounds, its composition being then: active $Na_2O$ titratable by methylorange 41.9 g./l., arsenious oxide 31.7 g./l., pentavalent arsenic expressed as $As_2O_3$ 10.6 g./l., sulphur bound as monothioarsenate 1.6 g./l., sulphur as sodium sulphocyanide 13.8 g./l., sulphur as sulphur oxidation compounds 7.4 g./l. As a result of extensive use of this improvement in which a proportion of the solution was continuously drawn off from the absorption circuit and heated to 250° C. at a pressure of 43 atm., the proportion was found to be modified as an average to the following composition: active $Na_2O$ titratable by methylorange 82 g./l., arsenious oxide 31.7 g./l., pentavalent arsenic expressed as $As_2O_3$ 10.6 g./l., sulphur bound as thiosalt 20.1 g./l., sulphur as sodium sulphocyanide 1.5 g./l., sulphur as sulphur oxidation compounds 0.6 g./l. This likewise shows that in addition to decomposition of sulphocyanide with recovery of sulphur and alkali, decomposition of the sulphur oxidation compounds occurs with recovery of the sulphur contained therein and of alkali as well by a quantity larger than corresponds to thiosulphate.

In the latter just as in the preceding case, both research work and industrial practice disclose that sulphur oxidation compounds exist other than thiosulphate. For thiosulphate is not liable to decompose by hot treatment of the solution as mentioned above, while said compounds decompose in the hot yielding both sulphur and alkali therein.

This novel type of compounds, the sulphur of which binds a larger alkali quantity than corresponds to thiosulphate possibly explains weakening of the absorbing properties of the solution, which was ascertained on a larger scale than if due to formation of sulphocyanide and thiosulphate.

Formation within the absorbing solutions of sulphur oxidation compounds is probably due to the fact that the action of oxygen on the sulphurated compounds in the solution does not directly bind sulphur to its thiosulphate stage direct, but rather through intermediate oxidation stages at which the sulphur is still bound in a labile recoverable form. Such compounds, which have been referred to herein as intermediate oxidation sulphurated compounds, co-exist with thiosulphate and are gradually converted to thiosulphate, so that the improved method will operate more favourably before sulphur resulting from the secondary oxidation reaction reaches its stable thiosulphate form.

What I claim is:

1. In a method of purifying a gaseous mixture containing acidic compounds to remove said compounds therefrom by scrubbing the gaseous mixture with an alkaline absorbing solution containing sodium carbonate, and including an arsenate and an arsenite, wherein thiosulphates are formed in the absorbing solution, the improvement consisting of heating said thiosulphates and at least the normally solid components of said solution associated therewith to a temperature of at least 200° C. to effect decomposition of said thiosulphates, said solution containing an arsenate and an arsenite and said heating being effected in the presence of said arsenate and arsenite.

2. In a method of purifying a gaseous mixture containing acidic compounds to remove said compounds therefrom by scrubbing the gaseous mixture in an absorption zone with an alkaline absorbing solution containing sodium carbonate and including an arsenite and an arsenate wherein thiosulphates are formed in the absorbing solution, the improvement consisting of withdrawing at least part of said solution, drying said part of said solution, heating the resulting solid residue to a temperature of at least 200° C. to 400° C. to effect decomposition of said thiosulphates, redissolving the thus-heated solid residue and returning the resulting solution to the absorption zone.

3. In a method of purifying a gaseous mixture containing acidic compounds to remove said compounds therefrom by scrubbing the gaseous mixture in an absorption zone with an alkaline absorbing solution containing sodium carbonate and including an arsenate and arsenite wherein thiosulfates are formed in the absorbing solution, the improvement consisting of withdrawing at least a part of said solution, heating the withdrawn part of said solution to a temperature of at least 200° to 400° C. at superatmospheric pressure to effect decomposition of the thiosulphates, and returning said part of the solution to the absorption zone.

References Cited in the file of this patent

UNITED STATES PATENTS

| 1,861,268 | Gollmar | May 31, 1932 |

FOREIGN PATENTS

| 494,281 | Great Britain | Oct. 24, 1938 |
| 17,302/28 | Australia | Jan. 10, 1930 |